United States Patent
Sim et al.

(10) Patent No.: US 9,337,896 B2
(45) Date of Patent: May 10, 2016

(54) BLOCK FILTER FOR POWER LINE COMMUNICATION

(71) Applicant: LSIS CO., LTD., Anyang-si, Gyeonggi-do (KR)

(72) Inventors: Jae Kang Sim, Anyang-si (KR); Young Gyu Yu, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 733 days.

(21) Appl. No.: 13/711,517

(22) Filed: Dec. 11, 2012

(65) Prior Publication Data

US 2013/0156116 A1     Jun. 20, 2013

(30) Foreign Application Priority Data

Dec. 19, 2011  (KR) .................. 10-2011-0137302

(51) Int. Cl.
*H04B 3/54* (2006.01)
*H04B 3/56* (2006.01)

(52) U.S. Cl.
CPC .. *H04B 3/54* (2013.01); *H04B 3/56* (2013.01); *H04B 2203/5491* (2013.01)

(58) Field of Classification Search
CPC ..... H04B 3/54; H04B 3/56; H04B 2203/5491
USPC .......................................................... 307/1
See application file for complete search history.

(56) References Cited

U.S. PATENT DOCUMENTS 4,136,319 A * 1/1979 Bourde .............................. 333/1
7,158,003 B2    1/2007 Cern et al.

FOREIGN PATENT DOCUMENTS

| CN | 101647207 | 2/2010 |
|----|-----------|--------|
| CN | 101755374 | 6/2010 |
| FR | 2345852 | 10/1977 |
| JP | 2002-232331 | 8/2002 |
| JP | 2007-060522 | 3/2007 |
| KR | 10-0454106 | 10/2004 |
| KR | 2010065476 A * | 6/2010 |
| KR | 10-0996139 | 11/2010 |
| WO | 2008123182 | 10/2008 |

OTHER PUBLICATIONS

European Patent Office Application Serial No. 12196520.6, Search Report dated Mar. 6, 2013, 6 pages.
Korean Intellectual Property Office Application Serial No. 10-2011-0137302, Notice of Allowance dated Apr. 19, 2013, 3 pages.
The State Intellectual Property Office of the People's Republic of China Application Serial No. 201210555550.0, Office Action dated Jun. 27, 2014, 5 pages.
Japan Patent Office Application Serial No. 2012-276821, Office Action dated Nov. 12, 2013, 3 pages.

* cited by examiner

*Primary Examiner* — Thienvu Tran
*Assistant Examiner* — Kevin J Comber
(74) *Attorney, Agent, or Firm* — Lee Hong Degerman Kang & Waimey; Jonathan Kang; Jeffrey Lotspeich

(57) ABSTRACT

Provided is a blocking filter for PLC, the blocking filter including a low pass filter unit including a capacitor and a plurality of inductors, a plurality of magnetic saturation prevention circuits each connected to the inductor in parallel to prevent magnetic saturation of the inductor, and operating in response to an interruption control signal inputted from outside, and a first switch connected or opened in response to the interruption control signal and interconnected between the low pass filter unit and a neutral line.

7 Claims, 2 Drawing Sheets

BLOCK FILTER FOR POWER LINE COMMUNICATION

CROSS-REFERENCE TO RELATED APPLICATIONS

Pursuant to 35 U.S.C. §119 (a), this application claims the benefit of earlier filing date and right of priority to Korean Patent Application No. 10-2011-0137302, filed on Dec. 19, 2011, the contents of which are hereby incorporated by reference herein in their entirety.

BACKGROUND OF THE DISCLOSURE

1. Field of the Disclosure

The present disclosure relates to a blocking filter, and more particularly to a blocking filter for power line communication.

2. Discussion of the Related Art

The information disclosed in this Discussion of the Related Art section is only for enhancement of understanding of the general background of the present disclosure and should not be taken as an acknowledgement or any form of suggestion that this information forms the prior art already known to a person skilled in the art.

Generally, a PLC (Power Line Communication) is a method of transmitting data (e.g., voice sound, data signal) by superimposing a PLC signal (2 to 30 MHz) having a high frequency, being an information signal, on a signal having a commercial frequency (50 to 60 Hz) transmitted to an indoor or outdoor high voltage or low voltage power line.

PLC (networks) can advantageously utilize existing power lines, dispensing with additional installation of communication lines, to reduce investment cost and to facilitate computer networking (or networking of other appliances such as audio/video equipment) using a simple connection of plugs. In addition to the abovementioned advantage, concomitant with desire to intelligently control consumer facilities and development of information devices, the PLC is briskly applied to such fields as AMR (Automatic Meter Reading) system, home network system, AMI (Advanced Metering Infrastructure) system and factory automation.

In PLC system, lots of branches (equipment) exist on the PLC to disadvantageously cause signal loss and inroad of noise. In order to overcome this restriction, a blocking filter may be required to prevent generation of unnecessary signal flow in PLC frequency band, e.g., flow of PLC communication signal into the PLC branches, prevention of generation of noise caused by abnormal power facilities, prevention of flow of unnecessary signal due to inflow of noise generated by neighboring equipment, or to minimize mutual interference of PLC signals in individual networks using respectively different PLC technologies.

For example, use of a blocking filter is recommended in order to prevent high indoor noise and low impedance in AMR system from influencing on outdoor PLC environments, and use of a blocking filter is required to make a physical difference among neighboring networks in home network system.

Meanwhile, the abovementioned blocking filter is generally installed after a consumer's utility meter, and since the AMI system uses the PLC from a concentrator to consumer's utility meter and ESI (Energy Service Interface), a PLC signal may not reach the ESI since an indoor ESI is positioned after the blocking filter, in consideration of a general installation position of the blocking filter.

As noted above, since applicability or installed position of the block filter is changed according to types of systems using the PLC, the blocking filter must be repeatedly installed or removed due to changes in PLC services to increase inconveniences to a power consumer or a power provider.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides a blocking filter for PLC configured to selectively block/transmit a communication signal flowing in a power line according to types of PLC systems.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a blocking filter for PLC, the blocking filter comprising: a low pass filter unit including a capacitor and a plurality of inductors; a plurality of magnetic saturation prevention circuits each connected to the inductor in parallel to prevent magnetic saturation of the inductor, and operating in response to an interruption control signal inputted from outside; and a first switch connected or opened in response to the interruption control signal and interconnected between the low pass filter unit and a neutral line.

In some exemplary embodiments, the low pass filter unit may include first and second inductors connected to a power line in series, and a capacitor interconnected between a contact point of the first and second inductors and the first switch.

In some exemplary embodiments, the first switch is connected when the interruption control signal is turned on and the magnetic saturation prevention circuits may operate to prevent the magnetic saturation of the inductors.

In some exemplary embodiments, the first switch is opened when the interruption control signal is turned off and the magnetic saturation prevention circuits may not operate.

In some exemplary embodiments, the magnetic saturation prevention circuit may include a current transformer so installed as to wrap a periphery of the power line and to detect an input current proportionate to a current flowing in the power line, a low pass filter filtering a frequency signal higher than a predetermined signal in the input current, a phase correction circuit correcting a phase difference of an output signal of the low pass filter, and an amplification circuit amplifying the output signal of the phase correction circuit and providing the amplified output signal to the inductors.

In some exemplary embodiments, the magnetic saturation prevention circuit may further include a second switch connected or opened in response to the interruption control signal and interconnected between the low pass filter and the phase correction circuit.

In some exemplary embodiments, the phase correction circuit may correct a phase difference of the output signal of the low pass filter to allow the output signal to form a phase difference of 180° with the input current detected by the current transformer.

In some exemplary embodiments, an interruption frequency of the low pass filter unit may be determined by sizes of the first and second inductors and capacitor.

In some exemplary embodiments, each of the first and second inductors may have a saturation current having a level lower than that of a rated current of a molded-case circuit breaker.

The blocking filter for PLC according to the present disclosure has an advantageous effect in that an outdoor PLC signal and an indoor PLC signal can be interrupted or transmitted in response to an interruption control signal inputted from outside to enable application to various PLC systems without going through repeated installation/removal processes.

Other exemplary aspects, advantages, and salient features of the disclosure will become more apparent to persons of ordinary skill in the art from the following detailed description, which, taken in conjunction with the annexed drawings, discloses exemplary embodiments of the invention.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinafter by way of illustration only, and thus are not limitative of the present invention, and wherein.

Figure 1:
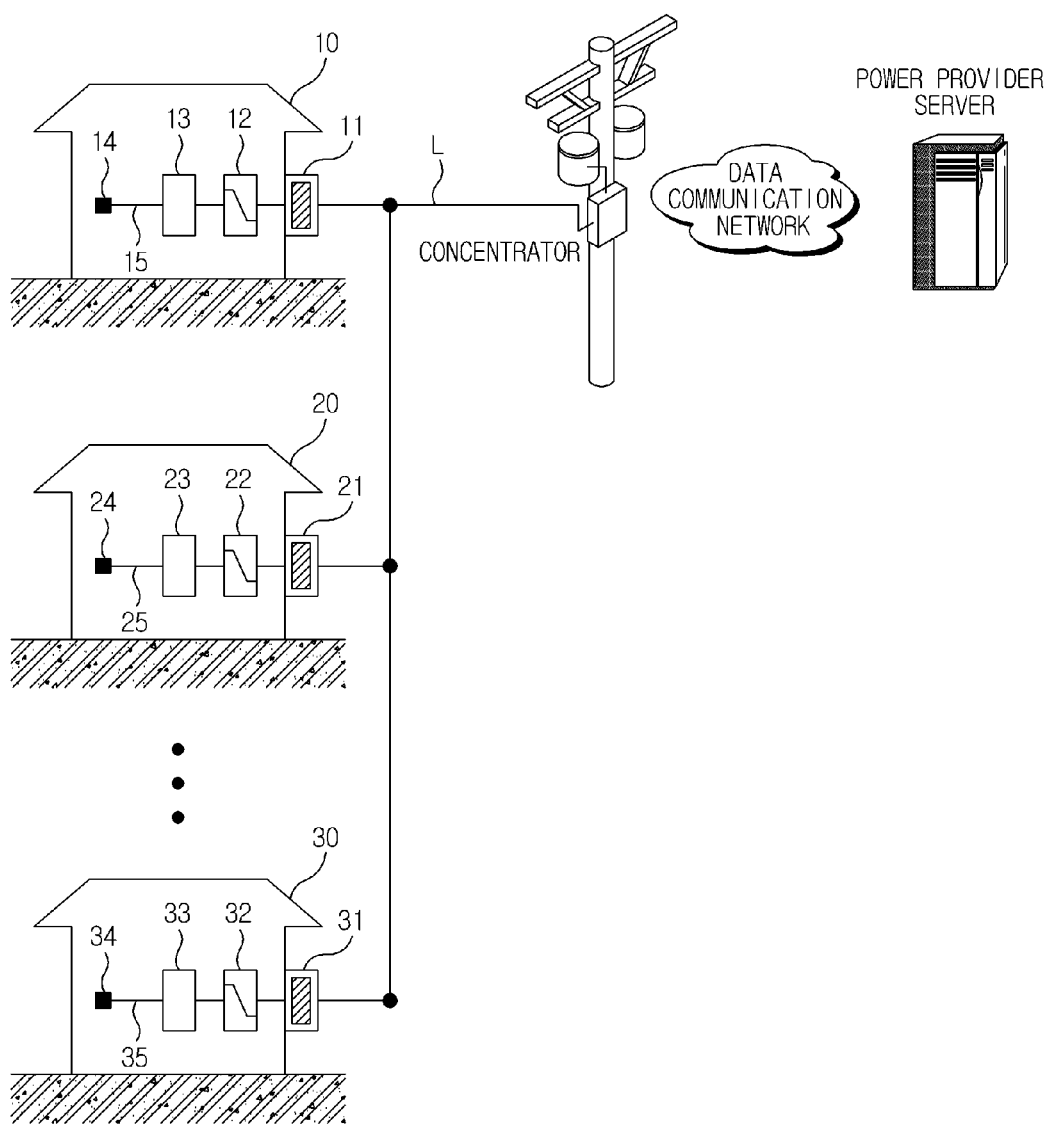
FIG. 1 is a schematic view illustrating an AMR system using a PLC according to an exemplary embodiment of the present disclosure.

Additional advantages, objects, and features of the disclosure will be set forth in part in the description which follows and in part will become apparent to those having ordinary skill in the art upon examination of the following explanation or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably. That is, the terms "-er", "-or", "part" and "module" described in the specification mean units for processing at least one function and operation and can be implemented by hardware components or software components, and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Unless specifically stated otherwise, as apparent from the following discussions, it should be understood that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

FIG. 1 is a schematic view illustrating an AMR system using a PLC according to an exemplary embodiment of the present disclosure.

Referring to FIG. 1, the AMR system includes a power provider server, a concentrator performing a high speed bidirectional communication with the power provider server through a data communication network, and a plurality of consumers (10, 20, 30).

The power provider server receives various reading information of each consumer (10, 20, 30) from the concentrator through the data communication network. The reading information indicates monthly, weekly, daily and time-wise power consumption, instantaneous power consumption, a total sum of power consumption of each consumer (10, 20, 30).

The concentrator performs a PLC with respective consumers (10, 20, 30) through an outdoor power line (L), where the outdoor power line means a low voltage distribution line installed between the concentrator and each consumer (10, 20, 30) by being extended from an output terminal of a pole transformer. The concentrator receives the reading information from respective consumers (10, 20, 30) and provides the reading information to the power provider server through the data communication network.

Each consumer (10, 20, 30) may be installed with watt-hour meters (11, 21, 31), blocking filters (12, 22, 32), an ESI or home servers (13, 23, 33) and terminals (14, 24, 34). The watt-hour meters (11, 21, 31), blocking filters (12, 22, 32), an ESI or home servers (13, 23, 33) and terminals (14, 24, 34) are interconnected via indoor power lines (15, 25, 35) to enable a PLC.

Meanwhile, the blocking filters (12, 22, 32) of FIG. 1 may be selectively installed according to types or kinds of system using the PLC. For example, the blocking filters (12, 22, 32) may not be installed for AMI system, because the watt-hour meters (11, 21, 31) and the ESI (13, 23, 33) perform the PLC through the indoor power lines (15, 25, 35), such that if the blocking filters (12, 22, 32) are installed, a data transmission between the watt-hour meters (11, 21, 31) and the ESI (13, 23, 33) may not be realized.

In another example, the blocking filters (12, 22, 32) must be installed in home network system in order to prevent various indoor noise signals from discharging outside and to interrupt an indoor inflow of noise signals such as PLC signals of neighboring consumers. Furthermore, it is essential to install the blocking filters (12, 22, 32) in the AMR system where bi-directional communication is not realized, which is to prevent various indoor noise signals from discharging outside.

As noted from the foregoing, the installation/removal of blocking filters may be unnecessarily repeated according to types of PLC systems. Thus, a blocking filter that may be applicable regardless of the types or kinds of PLC system will be described hereunder.

Figure 2:
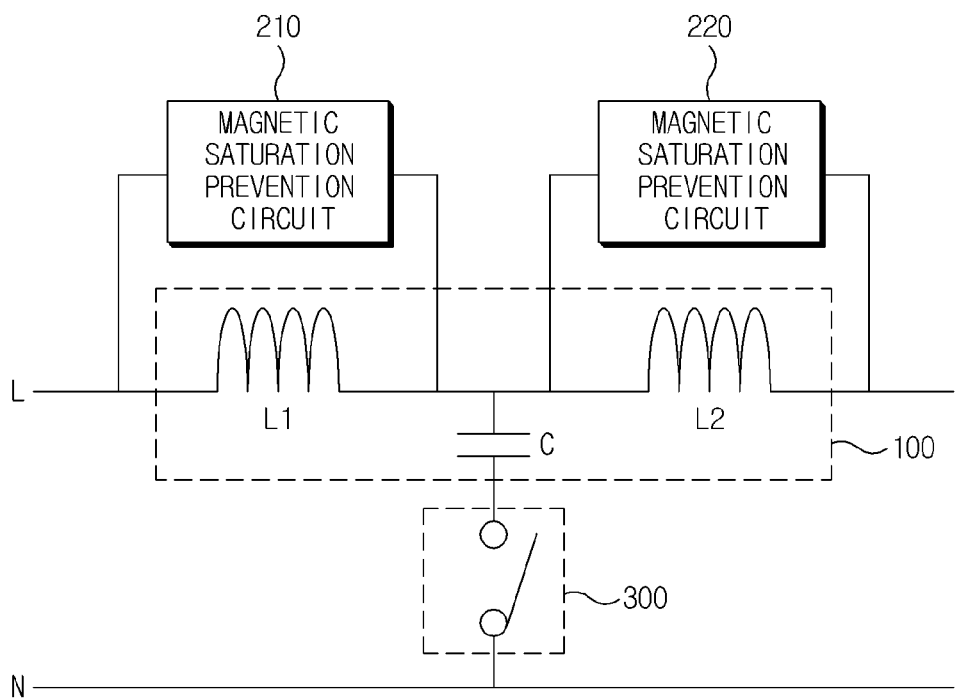
FIG. 2 is a schematic view illustrating a blocking filter for a PLC according to an exemplary embodiment of the present disclosure.

FIG. 2 is a schematic view illustrating a blocking filter for PLC according to an exemplary embodiment of the present disclosure.

Referring to FIG. 2, a blocking filter for PLC according to an exemplary embodiment of the present disclosure includes a low pass filter unit (100), magnetic saturation prevention circuits (210, 220) and a switch (300).

The low pass filter unit (100) includes first and second inductors (L1, L2) connected in series to the power line (L), and a capacitor (C) connected at one distal end to a contact point between the first and second inductors (L1, L2) and connected at the other distal end to the switch (300).

The magnetic saturation prevention circuits (210, 220) are respectively connected to the first and second inductors (L1, L2) in parallel to prevent magnetic saturation of the first and second inductors (L1, L2). The magnetic saturation prevention circuits (210, 220) are preferably determined of operations by an interruption control signal inputted from outside, and may include a switch connected or opened in response to the interruption control signal.

As the magnetic saturation prevention circuits (210, 220) are determined of operations by the interruption control signal, saturation/non-saturation of the first and second inductors (L1, L2) is also determined by the interruption control signal, whereby filtering/non-filtering of the low pass filter unit (100) is also determined by the interruption control signal, details of which will be described later.

The blocking filter for a PLC according to an exemplary embodiment of the present disclosure thus configured can filter or pass along a PLC signal according to an interruption control signal inputted from outside. The interruption control signal may be manually inputted by a power user at a house consumer, or may be transmitted to the consumer by being predetermined by a power provider server according to kinds of systems using the PLC.

Hereinafter, the interruption control signal being turned on indicates that the blocking filter filters an input signal, and may be applied to a home network system and AMR system using the PLC. Furthermore, the interruption control signal being turned off indicates that the blocking filter passes (transmits) an input signal as it is, and may be applied to the AMI system.

The interruption control signal being turned on allows the switch (300) to be connected, and the magnetic saturation prevention circuits (210, 220) to operate, whereby the blocking filter can filter the input signal. That is, connection of the switch (300) allows the capacitor (C) to be interconnected between a contact point between the first and second inductors (L1, L2) and a neutral line (L).

Furthermore, operation of the magnetic saturation prevention circuits (210, 220) disables the saturation of the first and second inductors (L1, L2).

Therefore, the interruption control signal being 'ON' allows the blocking filter for a PLC according to an exemplary embodiment of the present disclosure becomes a low pass filter formed by a capacitor connected in parallel between a contact point between the two inductors (L1, L2) connected the power line and a neutral line, whereby a high pass signal can be filtered based on an interruption frequency. The interruption signal is determined by sizes of the first and second inductors (L1, L2) and the capacitor (C), which is well known to the skilled in the art such that no more further explanation thereto will be made.

Meanwhile, the interruption control signal being 'OFF' allows the switch (300) to be opened and the magnetic saturation prevention circuits (210, 220) to be inoperative, whereby the blocking filter passes the input signal as it is. That is, a parallel branch connected by the capacitor (C) is opened as the switch (300) is opened, and the magnetic saturation prevention circuits (210, 220) become inoperative, whereby the first and second inductors (L1, L2) are saturated to allow an impedance of serial branch to be substantially zero ('0', i.e., electrically short-circuited). Thus, in case of the interruption control signal being 'OFF', the impedance of serial branch in the blocking filter for PLC according to an exemplary embodiment of the present disclosure is '0', and the parallel branch is opened, whereby the signal flowing in the power line passes and transmitted as it is.

As noted from the foregoing, the blocking filter for PLC according to an exemplary embodiment of the present disclosure may be advantageously applied to various systems using the PLC, because a PLC signal can be transmitted without any filtering or can be operated as a low pass filter capable of filtering a predetermined frequency band according to an interruption control signal inputted from outside.

Figure 3:
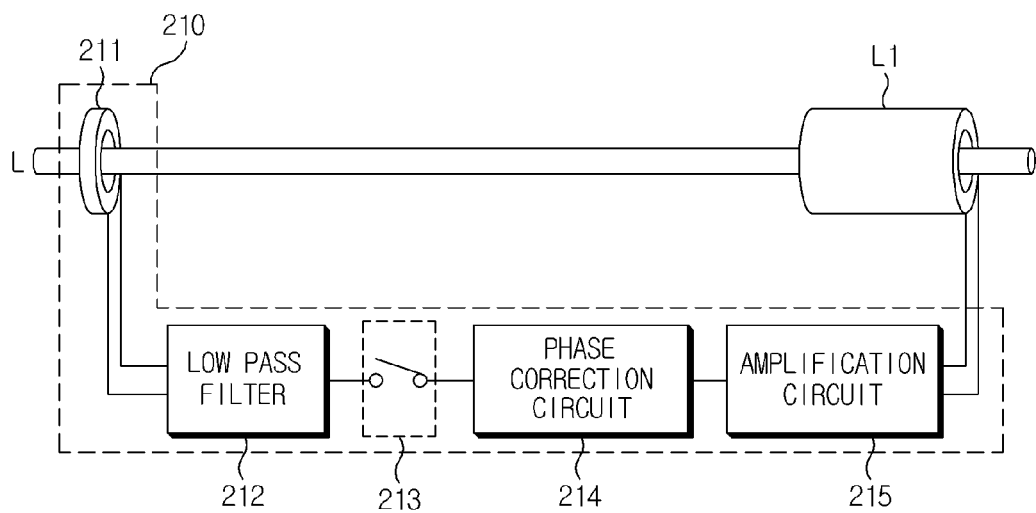
FIG. 3 is a schematic view illustrating a magnetic saturation prevention circuit installed on a blocking filter for a PLC according to an exemplary embodiment of the present disclosure.

FIG. 3 is a schematic view illustrating a magnetic saturation prevention circuit mounted at a blocking filter for PLC according to an exemplary embodiment of the present disclosure.

Referring to FIG. 3, the magnetic saturation prevention circuit includes a current transformer (CT, 211), a low pass filter (LPF, 212), a phase correction circuit (214), an amplification circuit (215) and a switch (213) opened or connected in response to an interruption control signal inputted from outside.

The magnetic saturation prevention circuits (210, 220) respectively connected in parallel to the first and second inductors (L1, L2) illustrated in FIG. 2 may be substantially equal as those in FIG. 3, and as a result, FIG. 3 has illustrated the first inductors (L1) and the magnetic saturation prevention circuit (210) connected to the first inductor (L1).

The current transformer (211) is discrete from the first inductor (L1) at a predetermined distance to wrap a periphery of the power line (L). The current transformer (211) provides an input current for allowing a negative phase current to flow in the first inductor (L1), and obtains the input current that is in proportionate to a current flowing in the power line (L).

The low pass filter (212) functions to filter a predetermined frequency from the input current inputted from the current transformer (212), e.g., a signal of frequency higher than that of the power signal (60 Hz). The phase correction circuit (214) corrects a phase difference of the signal filtered by the low pass filter (212) to generate an output current having a phase difference of 180° with the input current which has an opposite phase from the input current.

The amplification circuit (215) may amplify the output current generated by the phase correction circuit (214) at a predetermined gain and provide the amplified output current to the first inductor (L1). The switch (215) may be opened or connected in response to an interruption control signal inputted from outside to determine whether to operate the magnetic saturation prevention circuit (210). That is, as illustrated in FIG. 2, the interruption control signal being 'OFF' may allow the switch to open and allow the magnetic saturation prevention circuit (210) to be inoperative, and the interruption control signal being 'ON' may allow the switch to be connected and allow the magnetic saturation prevention circuit (210) to be operative.

Meanwhile, although FIG. 3 has illustrated that the switch (213) is interposed between the low pass filter (212) and the phase correction circuit (214), the switch (213) may be installed at various positions capable of interrupting signal flow of the magnetic saturation prevention circuit (210).

The magnetic saturation prevention circuit (210) prevents the magnetic saturation of the first inductor (L1) generated by a high current flowing in the power line (L) by allowing a negative phase current to flow in the first inductor (L1) to offset a magnetic flux. That is, the first inductor (L1) can interrupt the flow of PLC signal by inducing impedance greater than a predetermined size on the power line (L) of primary side according to the electromagnetic induction theory, where a ferrite core may be used for obtaining an excellent damping characteristic in a frequency band of the PLC.

In this magnetic substance, as the size of current flowing in the power line increases, a magnetic field may increase, and as the magnetic field increases, a magnetic flux density may increase to generate a magnetic saturation. Particularly, the ferrite core is very low in a maximum saturation magnetic flux density, and therefore is prone to easily generate the magnetic saturation by the high current flowing in the power line, such that it is necessary to install the magnetic saturation prevention circuit for adequate interruption of the PLC signal, as explained in the foregoing.

Meanwhile, the first and second inductors (L1, L2) in the blocking filter for PLC according to an exemplary embodiment of the present disclosure may have a saturation current of lower level than that of a rated current of MCCB (Molded Case Circuit Breaker).

Thus, the first and second inductors (L1, L2) may be saturated, in a case the blocking filter is inoperative (i.e., the interruption control signal is 'OFF'), and the first and second inductors (L1, L2) may not be saturated, in a case the blocking filter is operative (i.e., the interruption control signal is 'ON'). Thus, use of an inductor having a low saturation current can realize a blocking filter of low cost.

The above-mentioned blocking filter for PLC according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

The above-mentioned blocking filter for PLC according to the present disclosure has an industrial applicability in that an outdoor PLC signal and an indoor PLC signal can be interrupted or transmitted in response to an interruption control signal inputted from outside to enable application to various PLC systems without going through repeated installation/removal processes.

What is claimed is:

1. A blocking filter for power line communication (PLC), the filter comprising:
    a low pass filter unit configured to include a capacitor and a plurality of inductors;
    a plurality of magnetic saturation prevention circuits each connected to the inductor in parallel to prevent magnetic saturation of the inductor, and configured to operate in response to an interruption control signal inputted from outside; and
    a first switch connected or opened in response to the interruption control signal and interconnected between the low pass filter unit and a neutral line,
    wherein each of the magnetic saturation prevention circuits comprises:
    a current transformer so installed as to wrap a periphery of the power line and to detect an input current proportionate to a current flowing in the power line;
    a low pass filter configured to filter a frequency signal higher than a predetermined signal in the input current;
    a phase correction circuit configured to correct a phase difference of an output signal of the low pass filter;
    an amplification circuit configured to amplify the output signal of the phase correction circuit and to provide the amplified output signal to the inductors; and
    a second switch connected or opened in response to the interruption control signal and interconnected between the low pass filter and the phase correction circuit.

2. The filter of claim 1, wherein the low pass filter unit comprises:
    first and second inductors connected to the power line in series; and
    a capacitor interconnected between a contact point of the first and second inductors and the first switch.

3. The filter of claim 1, wherein the first switch is connected when the interruption control signal is turned on and the magnetic saturation prevention circuits operate to prevent the magnetic saturation of the inductors.

4. The filter of claim 1, wherein the first switch is opened when the interruption control signal is turned off and the magnetic saturation prevention circuits do not operate.

5. The filter of claim 1, wherein the phase correction circuit corrects a phase difference of the output signal of the low pass filter to allow the output signal to form a phase difference of 180° with the input current detected by the current transformer.

6. The filter of claim 2, wherein an interruption frequency of the low pass filter unit is determined by sizes of the first and second inductors and capacitor.

7. The filter of claim 2, wherein each of the first and second inductors has a saturation current having a level lower than that of a rated current of a molded-case circuit breaker.

* * * * *